United States Patent [19]
Frisco

[11] 3,868,119
[45] Feb. 25, 1975

[54] ADJUSTABLE UNIVERSAL COUPLING

[76] Inventor: Theodore E. Frisco, 7503 Dearborn Ave., Cleveland, Ohio 44102

[22] Filed: July 18, 1973

[21] Appl. No.: 380,509

[52] U.S. Cl. .............................................. 279/16
[51] Int. Cl. ........................................... B23b 31/04
[58] Field of Search ............ 279/16, 18, 6, 1 L, 1 S

[56] References Cited
UNITED STATES PATENTS

| | | | |
|---|---|---|---|
| 1,431,830 | 10/1922 | Miller | 279/16 |
| 2,416,586 | 2/1947 | Jones | 279/16 |
| 2,475,385 | 7/1949 | Frisco | 279/16 |
| 2,865,642 | 12/1958 | Kelsey | 279/16 |

Primary Examiner—Gil Weidenfeld
Attorney, Agent, or Firm—McNenny, Farrington, Pearne & Gordon

[57] ABSTRACT

A universal coupling embodied as a tool holder including adjustment means to selectively limit misalignment of a coupled shank and holder. As disclosed, the adjustment means comprises a tapered collar axially slidable on the holder and engageable with an extension on the shank. The collar aligns the holder to the shank when it is fully abutted against the extension and, otherwise, variably limits misalignment according to its axial position on the holder away from the shank.

1 Claim, 2 Drawing Figures

PATENTED FEB 25 1975  3,868,119

1

ADJUSTABLE UNIVERSAL COUPLING

BACKGROUND OF THE INVENTION

The invention relates to improvements in universal couplings of the type in which torque is transferred between a pair of oppositely extending members each defining a separate axis and, more particularly, relates to such apparatus wherein means are provided to adjustably limit misalignment of the axes of the members.

The invention is particularly adapted for use with prior types of couplings such as are disclosed in my U.S. Pat. Nos. 2,468,396; 2,475,385; 2,475,386. Tool holder apparatus as shown in these patents generally includes a shank member and a holder member disposed end to end. Interengaging projections and grooves or other torque transmitting means are provided at the end faces of the shank and holder to allow torque to be transferred from one member to the other independently of misalignment of their axes.

In many situations it is desirable to control maximum misalignment to thereby regulate or minimize non-uniform motion of the members. For example, in high speed operation it may be desirable to limit the maximum allowable misalignment to maintain vibrational forces within a non-destructive range. In other cases, it may be desirable to completely eliminate or prevent any significant misalignment between the members such as when it is convenient to use the apparatus as a conventional, non-universal tool holder.

SUMMARY OF THE INVENTION

The invention provides adjustment means in a universal coupling for selectively limiting or altogether eliminating misalignment between the coupling members. The adjustment means may thus be used to maintain non-uniform motion in a suitable range and, alternatively, completely align the coupling members and thereby produce a straight coupling whenever necessary or desirable.

In the preferred embodiment, the adjustment means comprises an axially adjustable collar on one of the coupling members. The other coupling member is provided with a housing which encloses the coupled ends of the members. At its outward end, the housing is provided with an annular stop surface concentric with the axis of its associated member. The adjustable collar includes a circular stop surface concentric with the axis of its associated coupling member. The collar stop surface is adapted to engage the annular stop surface on the housing when the members reach a given degree of misalignment. Preferably, the collar stop surface is conical and the collar is positioned so that this conical surface is normally encircled by the housing stop surface.

With such an arrangement, as the collar is moved axially away from or towards the housing, its effective size in the housing changes to provide more or less radial clearance and thus vary the possible range of misalignment of the coupling members. When the collar is moved to an extreme inward position, it seats against the housing stop surface around its full periphery to cause the coupling members to assume a position where their axes are coincident.

DESCRIPTION OF THE PREFERRED EMBODIMENT

Figure 1:
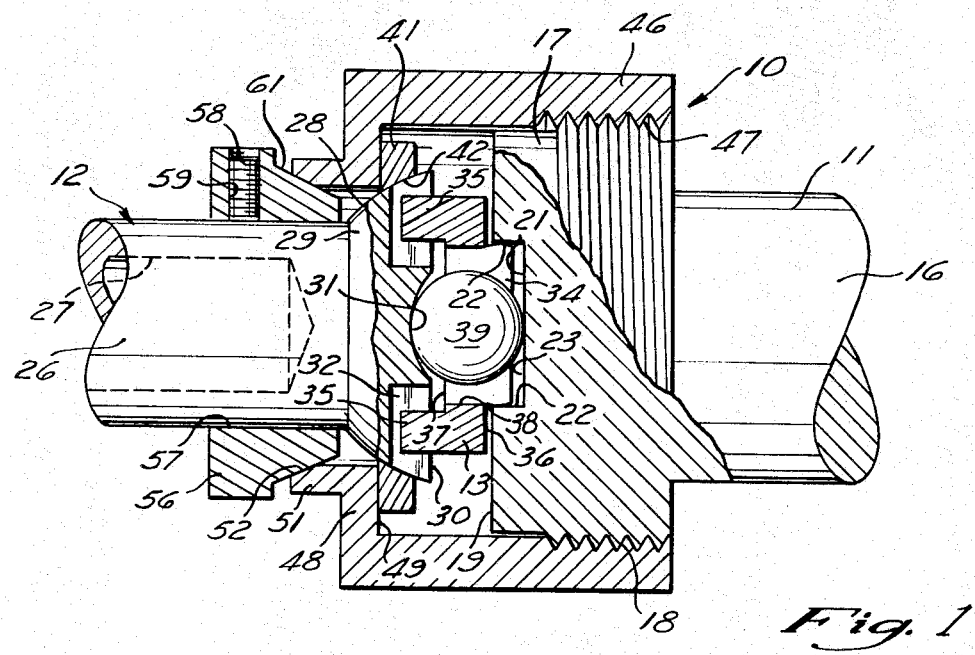
FIG. 1 is an elevational view, partly in section, of an adjustable universal coupling in accordance with the invention.

Referring now to the drawing, there is illustrated a constant velocity type universal coupling, in accordance with the invention, in the form of a tool holder 10. A shank 11 of the tool holder 10 is connected to a holder member 12 by a drive coupler 13. The coupler 13 transmits torque between the holder 12 and shank 11 and prevents relative rotation therebetween.

Away from the center portion of the tool holder 10, the shank 11 includes a cylindrical extension 16 adapted to be inserted and held in a collet or chuck of a machine tool or fixture. At its inner or coupled end, the shank 11 includes an enlarged cylindrical portion 17 having external threads 18 formed on its outer circumference. The enlarged cylindrical portion 17 and the cylindrical extension 16 are coaxially arranged. An end face 19 defines the inner end of the enlarged cylindrical portion 17 of the shank 11. A diametral slot or groove 21 including axially extending sides 22 is machined across the end face 19 with a substantially uniform depth so that a substantially flat thrust surface 23 parallel to the face 19 is formed.

Figure 2:
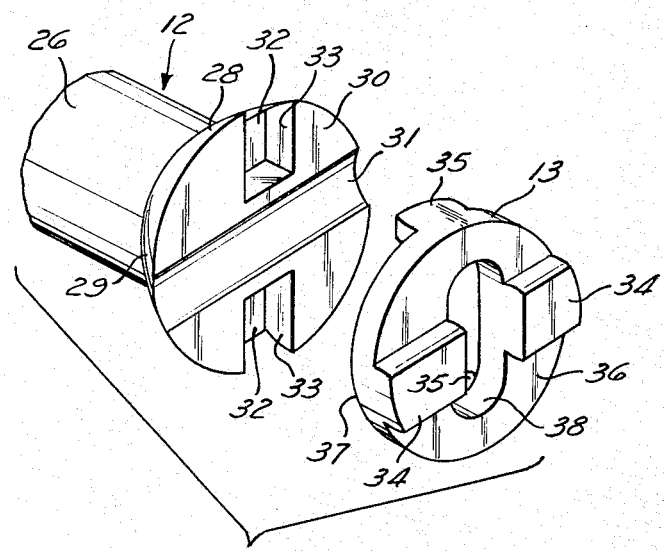
FIG. 2 is a perspective exploded view of certain parts of the coupling illustrating specific details thereof.

Referring both to FIGS. 1 and 2, the member 12 includes a generally cylindrical tool holder extension 26 having an axial bore 27 for the mounting of a tool such as a reamer or tap therein. The cylindrical holder extension 26 extends inwardly toward a head portion 28 of the holder 12 which has a spherical external surface 29. The cylindrical holder extension 26 and the head portion 28 are coaxially arranged. At its inner or coupled end, the head portion 28 is provided with a face 30. A shallow, cylindrical, diametral slot or groove 31 is formed across the face 30. Transverse to this diametral slot 31 are formed a pair of radial slots 32. The radial slots 32 include side faces 33 and extend radially inwardly from the outer periphery of the head 28 to points short of the diametral slot 31.

The coupler 13 is a generally circular disc or plate having lugs or projections 34 and 35 on opposite faces 36 and 37 respectively with the projections of one side running transverse to the projections of the other side. The projections 34 and 35 are dimensioned to provide sliding fits in the slots 21 of the shank portion 17 and 32 of the holder 12 respectively. An elongated slot 38 is formed through the coupler 13 in line with the projections 35.

A thrust ball 39 is assembled between the shank 11 and holder 12 in their respective diametral slots 21 and 31 to transfer axial forces therebetween. The thrust ball 39 is dimensioned to slide in the slot 38 and maintain a spacing between the shank 11 and holder 12 such that the projections 34 and 35 of the coupler 13 do not ordinarily bottom in their respective slots 21 and 32. It may be appreciated that this arrangement permits limited universal motion of the holder 12 relative to the shank 11. More specifically, the axis of the holder 12 may be angularly misaligned with the axis of the shank 11 if the holder is caused to pivot on the thrust ball 39. Likewise, the axis of the holder 12 may become laterally misaligned with that of the shank 11 when the thrust ball 39 is caused to roll radially on the flat groove surface 23 of the shank 11. Further, it may be understood that a combination of both angular and lateral misalignment is permitted by the coupling arrangement.

A retaining washer 41 has an internal spherical surface 42 of substantially the same radius of curvature as that of the spherical external surface 29. A hollow cylindrical housing 46 having internal threads 47 is mounted on the cylindrical portion 17 by axially threading it thereon. The housing 46 includes a radially inwardly extending shoulder 48 having an internal radial face 49 adapted to engage the retaining washer 41. Normally the housing 46 is threaded onto the enlarged threaded shank portion 17 until the retaining washer 41 is firmly engaged by the radial face 49. The holder 12, the thrust ball 39, and the shank 11 are thereby held together without free play but loose enough to permit desired universal motion of the holder relative to the shank. The outer diameter of the thrust washer 41 is somewhat smaller than the internal diameter of the housing 46 to permit such motion of the holder.

At one end of the housing 46 an axial extension 51, integral with the radial shoulder 48, is formed with an internal conical stop surface 52 concentric with the axis of the shank 11. As illustrated in FIG. 1, the conical surface 52 increases in diameter with increasing distance from the center of the coupling 10 defined generally by the thrust ball 39. Ideally, the conical surface 52 is defined by a straight taper angle.

According to the invention there is provided a circular collar 56 having an internal cylindrical bore 57. The bore 57 is proportioned to provide a sliding fit on the cylindrical holder portion 26 with a minimum radial clearance therebetween. The collar 56 may be locked in a desired axial position on the holder 12 by tightening a locking set screw 58 threaded into a radial hole 59 in the collar 56. A conical stop surface 61 is formed on the outer periphery of the collar 56. The collar 56 is assembled such that the conical surface 61 increases in diameter along a direction away from the center of the coupling. Preferably, the surface 61 has a straight taper angle equal to the taper angle defining the conical surface 52 of the housing 46.

When the collar 56 is forced axially towards the shank 11 until it seats against the housing stop surface 52 around its full periphery, as illustrated in FIG. 1, the axes of the holder 12 and shank 11 are coincident. This results because each of the conical stop surfaces 52 and 61 are concentric with their associated coupling members 11 and 12 respectively. By adjustably moving the collar 56 away from the center of the coupling 10 its effective size within the conical housing bore 52 is reduced so that misalignment between the holder 12 and shank 11 is possible. It may be appreciated that the possible range of misalignment will increase as the collar 56 is moved away from the center of the coupling. The adjustable collar, when abutting the conical stop surface 52 at any point on its periphery, will limit both angular and lateral misalignment of the axes of the holder 12 and shank 11.

With its construction having now been described, operation and use of the tool holder should be obvious to one skilled in the art. In a typical application of the holder 10, the shank 11 may be chucked in a drill press while a reamer, for instance, is mounted in the holder bore 27. The tool holder 10 may then be caused to rotate while it is fed towards a stationary workpiece mounted on a bed of the drill press. Assuming that a hole in the workpiece is misaligned with the axis of the press within the range of misalignment permitted by the stop collar 56, the reamer will find and align with the axis of the hole while it is rotated into the workpiece by the drill press. In this situation, the shank revolves about its axis and that of the drill press while the holder revolves with its axis aligned with that of the hole. Similar uses of the holder will be obvious to those familiar with such devices and machines. When using a tap in the holder 10, it is often convenient to first limit the amount of possible misalignment, by properly adjusting the collar 56, until the tap is partially started into a hole. Thereafter, the collar may be released to afford maximum misalignment and minimize tool breakage.

Although a preferred embodiment of the invention has been shown and described in detail, it is to be understood that various modifications and rearrangements of parts may be resorted to without departing from the scope of the invention. By way of example, the housing 46 may be arranged with means for cooperation with the holder 12 or an element on it in a manner such that the axial position of the housing means is adjustable axially relative to the holder to provide selective adjustment of permissible misalignment between the shank 11 and holder.

What is claimed is:

1. In a tool holder including a shank member and a holder member each defining an axis of rotation, a hollow housing axially threaded on the exterior of the shank and including a portion extending axially away from the shank member, said holder member axially terminating in the housing portion spaced from said shank member, coupler drive means within said housing, said coupler means including lug portions engageable with cooperating means on each of said members to transfer torque and to allow lateral misalignment between said members, said holder member having an elongated arcuate groove along the end face received within the housing, said coupler means having an elongated slotted portion transverse to the groove in said holder member, ball means received in said slotted portion and engageable with the arcuate groove in said holder member and an end face of said shank member to transmit axial forces and to allow angular and lateral misalignment between said members, circular retaining means within said housing, a radial shoulder including an inner radial surface on said housing opposing said circular retaining means, said housing adjustable retaining said holder against said ball means according to its axial position on said shank, a stop collar on the exterior of the holder, said stop collar including a conical outer surface concentric with the axis of the holder, said radial shoulder including a conical stop surface concentric with the axis of the shank, said stop collar being axially adjustable on said holder such that said collar aligns the axes of said members when it is set at a first position where it is uniformly circumferentially seated against said conical stop surface and it allows misalignment between said members in an increasing manner as its axial distance from said conical stop surface is increased, and locking means to retain said collar at a desired axial position on said holder.

* * * * *